United States Patent
Toba et al.

(10) Patent No.: US 9,701,916 B2
(45) Date of Patent: Jul. 11, 2017

(54) METHOD FOR PRODUCING HIGH QUALITY BIODIESEL FUEL

(71) Applicant: NATIONAL INSTITUTE OF ADVANCED INDUSTRIAL SCIENCE AND TECHNOLOGY, Tokyo (JP)

(72) Inventors: Makoto Toba, Ibaraki (JP); Yohko Abe, Ibaraki (JP); Yuuji Yoshimura, Ibaraki (JP); Takehisa Mochizuki, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/030,226

(22) PCT Filed: Oct. 17, 2014

(86) PCT No.: PCT/JP2014/077636
§ 371 (c)(1),
(2) Date: May 27, 2016

(87) PCT Pub. No.: WO2015/056767
PCT Pub. Date: Apr. 23, 2015

(65) Prior Publication Data
US 2016/0264893 A1  Sep. 15, 2016

(30) Foreign Application Priority Data

Oct. 18, 2013 (JP) ................ 2013-217110

(51) Int. Cl.
*C10L 1/02* (2006.01)
*C10G 25/00* (2006.01)
*C10G 3/00* (2006.01)

(52) U.S. Cl.
CPC ............... *C10L 1/026* (2013.01); *C10G 3/50* (2013.01); *C10G 25/00* (2013.01);
(Continued)

(58) Field of Classification Search
None
See application file for complete search history.

(56) References Cited

U.S. PATENT DOCUMENTS 5,959,128 A * 9/1999 Kolstad .................... A21D 2/16
426/417
2009/0292133 A1   11/2009 Wakamatsu et al.
(Continued)

FOREIGN PATENT DOCUMENTS

JP   2004-307608   11/2004
JP   2007-099882    4/2007
(Continued)

OTHER PUBLICATIONS

Vera, C, et al., Absorption in Biodiesel Refining—A Review, Chapter 21, 2011, Biodiesel—Feedstocks and Processing Technologies, Dr. Margarita Stoytcheva (Ed.), pp. 427-458, & ref. page (33 pages).*

(Continued)

*Primary Examiner* — Yate K Cutliff
(74) *Attorney, Agent, or Firm* — Marshall, Gerstein & Borun LLP

(57) ABSTRACT

The purpose of the present invention is to provide a method for producing a high quality biodiesel fuel having excellent oxidation stability and few low-temperature deposits. This purpose can be achieved by the following: hydrogenating a biodiesel fuel so as to selectively convert unsaturated fatty acid monoglycerides and then removing fatty acid monoglycerides through precipitation; or using an adsorbent to further remove fatty acid monoglycerides to a high degree
(Continued)

from the biodiesel fuel produced using the method mentioned above.

19 Claims, 3 Drawing Sheets

(52) U.S. Cl.
CPC . *C10L 2200/0476* (2013.01); *C10L 2270/026* (2013.01); *C10L 2290/54* (2013.01); *C10L 2290/542* (2013.01); *Y02E 50/13* (2013.01)

(56) References Cited

U.S. PATENT DOCUMENTS

| | | |
|---|---|---|
| 2010/0024285 A1 | 2/2010 | Wang et al. |
| 2010/0186290 A1 | 7/2010 | Baudot et al. |
| 2010/0313468 A1 | 12/2010 | Jalalpoor et al. |
| 2013/0055625 A1 | 3/2013 | Toba et al. |
| 2013/0211115 A1 | 8/2013 | Dubois et al. |

FOREIGN PATENT DOCUMENTS

| | | |
|---|---|---|
| JP | 2007-176973 | 7/2007 |
| JP | 2007-332250 | 12/2007 |
| JP | 2011-506709 A | 3/2011 |
| JP | 2011-137091 | 7/2011 |
| WO | WO-2005/037969 A2 | 4/2005 |
| WO | WO-2006/129435 A1 | 12/2006 |
| WO | WO-2007/012190 A1 | 2/2007 |
| WO | WO-2007/076163 A2 | 7/2007 |
| WO | WO-2008/001934 A1 | 1/2008 |
| WO | WO-2008/055676 A1 | 5/2008 |
| WO | WO-2008/105518 A1 | 9/2008 |
| WO | WO-2009/002878 A1 | 12/2008 |
| WO | WO-2009/071893 A2 | 6/2009 |
| WO | WO-2010/002236 A1 | 1/2010 |
| WO | WO-2011/105291 A1 | 9/2011 |
| WO | WO-2012/004489 A1 | 1/2012 |

OTHER PUBLICATIONS

Search Report in International Application No. PCT/JP2014/077636 dated Dec. 9, 2014, 1 page.
International Preliminary Report on Patentability and Written Opinion in International Application No. PCT/JP2014/077636 dated Apr. 19, 2016, 5 pages.
Extended European Search Report in EP Application No. 14853965.3 dated Apr. 25, 2017, 8 pages.
Liu et al., "Production of Bio-Hydrogenated Diesel by Hydrotreatment of High-Acid-Value Waste Cooking Oil Over Ruthenium Catalyst Supported on Al-Polyoxocation-Pillared Montmorillonite", Catalysts, vol. 2, No. 4, Feb. 14, 2012, pp. 171-190.
Rapaka, "Reduction and Speciation of Monoglycerides to Produce High Quality Biodiesel", Thesis, University of Ottawa, Dec. 31, 2012, 98 pages.
Echim et al., "Improvement of Cold Filter Plugging Point of Biodiesel From Alternative Feedstocks", Fuel, IPC Science and Technology Press, Guildford, GB, vol. 93, Nov. 14, 2011, pp. 642-648.

* cited by examiner

METHOD FOR PRODUCING HIGH QUALITY BIODIESEL FUEL

TECHNICAL FIELD

The present invention relates to a method for producing a high quality biodiesel fuel having excellent oxidation stability and few low-temperature deposits.

BACKGROUND ART

Biodiesel fuels (BDF (registered trademark)) made of long chain fatty acid alkyl esters are obtained using vegetable oil/fats or animal oil/fats, which are natural products, as raw materials, and have therefore been introduced and become widely used in Europe and Southeast Asia as environmentally friendly alternatives to diesel fuel. European standard EN14214, Japanese Industrial Standard JIS K2390 and American National Standard ASTM D6751 have been established as specifications that stipulate product quality for the safe use of biodiesel fuels as vehicle fuels, and these quality standards must be satisfied when biodiesel fuels are mixed with diesel oil and supplied to the market.

As the use of biodiesel fuels has progressed, a variety of new problems have become apparent when biodiesel fuels are used in vehicles. Among these, a major problem that has been reported is that components that are readily precipitated in biodiesel fuels precipitate in fuel storage tanks and in filters in engine systems, which leads to problems such as clogging. Fatty acid monoglycerides (and especially saturated fatty acid monoglycerides) and steryl glycosides are given as examples of components that precipitate. As a result, specifications for reducing problems when biodiesel fuels are used in automobiles have been reviewed, and there has been a tendency for regulation values for fatty acid monoglycerides to become more stringent. In European standard EN14214, for example, the permitted value for fatty acid monoglycerides was 0.8 mass % or lower when the standard was established in 2003, but this upper limit was lowered to 0.7 mass % or lower when the standard was revised in 2013, and a further reduction has been demanded.

Fatty acid monoglycerides are an intermediate product in reactions in which biodiesel fuels are produced when transesterification reactions are carried out with oils and fats, and because transesterification reactions are equilibrium reactions, fatty acid monoglycerides are difficult to remove by means of reaction alone. As a result, attempts have been made to remove fatty acid monoglycerides and other glycerides by subjecting obtained biodiesel fuels to a variety of purification processes. Such biodiesel fuel purification processes include washing with water, distillation, removal by means of adsorbents, extraction and membrane separation. FIG. 1 is a diagram showing the outline of biodiesel fuel purification processes by means of conventional methods.

Fatty acid monoglycerides have 2 free hydroxyl groups in the glycerin moiety of the molecular structure, and are therefore slightly water-soluble. Attempts have been made to remove fatty acid monoglycerides by means of water washing by utilizing this water solubility. In removal methods involving washing with water, purified biodiesel fuel contains moisture, meaning that the biodiesel fuel does not meet standards in this state. As a result, a water-oil separation filter is used in order to remove the moisture (see PTL 1). In addition, water washing that also involves the use of a flocculant is carried out in order to prevent loss of methyl esters of fatty acids, which are primary components of biodiesel fuels obtained by means of water washing (see PTL 2).

Purification by distillation is carried out as a method for removing fatty acid monoglycerides (see PTL 3 to PTL 6). Such methods are effective for removing moisture and removing diglycerides and triglycerides, which have far higher boiling points than methyl esters of fatty acids, but fatty acid monoglycerides have similar boiling points to methyl esters of fatty acid, meaning that separation performance of fatty acid monoglycerides is insufficient when carrying out purification by distillation.

Removal and purification by using an adsorbent is carried out as a method for removing fatty acid monoglycerides (see PTL 7 to PTL 16). Silica gel, clay minerals (activated clay, montmorillonite, and the like), zeolites, diatomaceous earth, magnesium silicates, alumina, and the like, are used as adsorbents. Methods involving the use of an adsorbent achieve higher separation performance than washing with water or distillation, but because there is a limit to the amount adsorbed, a large quantity of adsorbent is required in cases where the quantity of fatty acid monoglycerides is high, meaning that adsorption performance depends on the type of adsorbent and the composition of the raw material oil (the crude biodiesel fuel) and spent adsorbent needs to be regenerated or disposed of.

Other methods for removing fatty acid monoglycerides include liquid-liquid extraction methods involving the use of a solvent (see PTL 17) and removal methods involving the use of a separation membrane (see PTL 18), but separation efficiency is not high and a complex procedure is required.

CITATION LIST

Patent Literature

[PTL 1] Japanese Patent Application Publication No. 2011-137091
[PTL 2] Japanese Patent Application Publication No. 2004-307608
[PTL 3] Japanese Patent Application Publication No. 2007-332250
[PTL 4] Japanese Patent Application Publication No. 2007-176973
[PTL 5] WO 2006/129435
[PTL 6] US Patent Application Publication No. 2010/0024285 (Specification)
[PTL 7] Japanese Patent Application Publication No. 2007-99882
[PTL 8] WO 2010/002236
[PTL 9] Japanese Translation of PCT Application No. 2011-506709
[PTL 10] WO 2009/071893
[PTL 11] WO 2009/002878
[PTL 12] WO 2008/055676
[PTL 13] WO 2008/001934
[PTL 14] WO 2007/076163
[PTL 15] WO 2007/012190
[PTL 16] WO 2005/037969
[PTL 17] WO 2012/004489
[PTL 18] US Patent Application Publication No. 2010/0186290 (Specification)
[PTL 19] WO 2008/105518
[PTL 20] WO 2011/105291

SUMMARY OF INVENTION

Technical Problem

In view of the problems involved in the existing features mentioned above, the objective of the present invention is to provide a simple method for producing a high quality biodiesel fuel having high oxidation stability and few low-temperature deposits by selectively removing fatty acid monoglycerides, which not only readily undergo precipitation and separation in storage tanks but also lead to clogging of filters in vehicle fuel supply systems.

Solution to Problem

While carrying out diligent research into how to achieve the objective mentioned above, the inventors of the present invention found that by hydrogenating a biodiesel fuel obtained by means of transesterification, hydrogenation of carbon-carbon double bonds in unsaturated fatty acid monoglycerides occurred more rapidly than hydrogenation of carbon-carbon double bonds in methyl esters of unsaturated fatty acids (see FIG. 2).

As a result, the inventors of the present invention actively utilized this phenomenon and selectively converted unsaturated fatty acid monoglycerides, which have high solubility in biodiesel fuels, into saturated fatty acid monoglycerides, which readily precipitate, by means of hydrogenation while suppressing excessive hydrogenation of methyl esters of unsaturated fatty acids, and then separated the precipitated fatty acid monoglycerides, thereby developing a method for producing a biodiesel fuel in which fatty acid monoglycerides are removed to a high degree and which exhibits high oxidation stability, and completing the present invention.

That is, the present invention provides the following inventions.

[1] A method for producing a high quality biodiesel fuel, including hydrogenating a biodiesel fuel so as to selectively convert unsaturated fatty acid monoglycerides into readily precipitatable saturated fatty acid monoglycerides and then removing fatty acid monoglycerides through precipitation.

[2] The method for producing a high quality biodiesel fuel according to [1], wherein the fatty acid monoglycerides are removed through precipitation and remaining fatty acid monoglycerides are then removed using an adsorbent.

Advantageous Effects of Invention

According to the present invention, by hydrogenating a biodiesel fuel so as to selectively convert unsaturated fatty acid monoglycerides, which exhibit high solubility in biodiesel fuels, into saturated fatty acid monoglycerides, which readily precipitate, it is possible to remove fatty acid monoglycerides readily by means of precipitation separation, and by carrying out further hydrogenation, it is possible to carry out partial hydrogenation of methyl esters of polyunsaturated fatty acids that are components that are readily oxidized and degraded, such as methyl linoleate and methyl linolenate, into methyl esters of monounsaturated fatty acids having higher stability, and therefore possible to produce a high quality biodiesel fuel from which fatty acid monoglycerides are removed and for which oxidation stability is increased.

DESCRIPTION OF EMBODIMENTS

Figure 3:
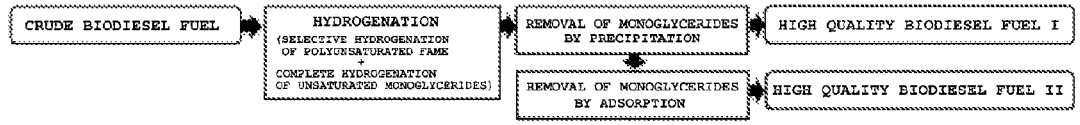
FIG. 3 is a diagram showing the outline of a biodiesel fuel production process according to the present invention.

FIG. 3 is a diagram showing the outline of a biodiesel fuel production process according to the present invention.

The present invention is characterized by producing a high quality biodiesel fuel I, in which the residual quantity of fatty acid monoglycerides is low and for which oxidation stability is increased, by selectively converting unsaturated fatty acid monoglycerides into readily precipitatable saturated fatty acid monoglycerides by hydrogenating a biodiesel fuel, in other words, carrying out "partial hydrogenation" of methyl esters of polyunsaturated fatty acid among methyl esters of fatty acids, which are primary components of biodiesel fuels, into methyl esters of monounsaturated fatty acids, carrying out "complete hydrogenation" of unsaturated fatty acid monoglycerides into saturated fatty acid monoglycerides, and then removing these fatty acid monoglycerides by means of precipitation separation.

In addition, the present invention is characterized by using an adsorbent to remove residual fatty acid monoglycerides from the high quality biodiesel fuel I following removal of the precipitated fatty acid monoglycerides, thereby producing a higher quality biodiesel fuel II.

The present invention will now be explained in detail.

In the present invention, biodiesel fuel means a substance which contains fatty acid triglycerides as primary components and which contains, as secondary components, components obtained by converting natural oils and fats formed of a mixture constituted from diglycerides and/or fatty acid monoglycerides into alkyl esters of fatty acids by means of transesterification with alcohols. Specifically, examples of natural oils and fats include vegetable oils and fats such as rape seed oil, sesame oil, jatropha oil, soy bean oil, corn oil, sunflower oil, palm oil, cottonseed oil, rice bran oil, coconut oil and safflower oil; animal oils and fats such as beef tallow, lard, chicken fat and fish oils; and waste oils and fats obtained from these oils and fats.

Hydrogenation is a reaction in which hydrogen is added to an unsaturated bond, but in the present invention, hydrogenation specifically means a reaction in which hydrogen is added to a carbon-carbon double bond in a methyl ester of an unsaturated fatty acid or unsaturated fatty acid monoglyceride, which are components of biodiesel fuels.

In the present invention, the method for hydrogenating a biodiesel fuel is not particularly limited, but if methyl esters of saturated fatty acids are generated by methyl esters of unsaturated fatty acids in a biodiesel fuel being completely hydrogenated, the pour point significantly increases and the biodiesel fuel cannot be used as a liquid fuel, meaning that it is preferable to use a method capable of hydrogenating only unsaturated fatty acid monoglycerides into saturated fatty acid monoglycerides and partially hydrogenating methyl esters of polyunsaturated fatty acids, which are components that are readily oxidized and degraded, into methyl esters of monounsaturated fatty acids having higher oxidation stability. For example, the methods disclosed in PTL 19 and PTL 20 can be given as examples of this type of hydrogenation method.

When using the method mentioned above, it is preferable to hydrogenate a biodiesel fuel at a reaction temperature of 80 to 130° C. and a hydrogen pressure of 0.2 to 0.7 MPa in order to selectively hydrogenate only unsaturated fatty acid monoglycerides into saturated fatty acid monoglycerides while suppressing complete hydrogenation of methyl esters of unsaturated fatty acids in the biodiesel fuel into methyl esters of saturated fatty acids, which is a characteristic of the present invention. If the reaction is carried out at a higher temperature or a higher pressure than these, complete hydrogenation into methyl esters of saturated fatty acids occurs to a significant extent. In addition, if the reaction is carried out at a lower temperature or a lower pressure than these, hydrogenation of unsaturated fatty acid monoglycerides does not progress sufficiently, which is a problem.

Figure 1:
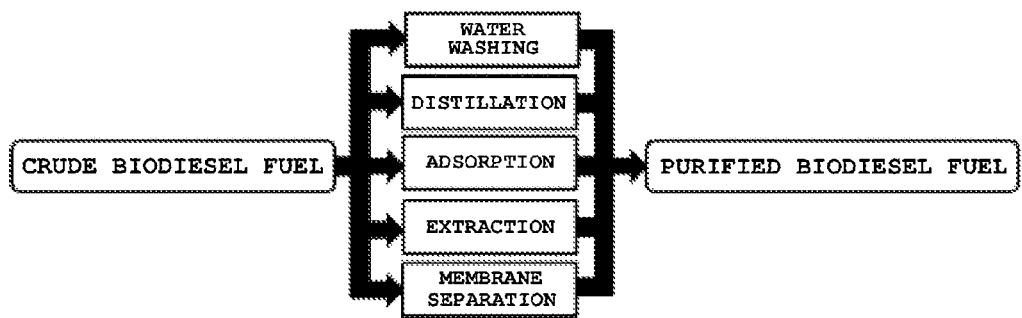
FIG. 1 is a diagram showing the outline of biodiesel fuel purification processes by means of conventional methods.
Figure 2:
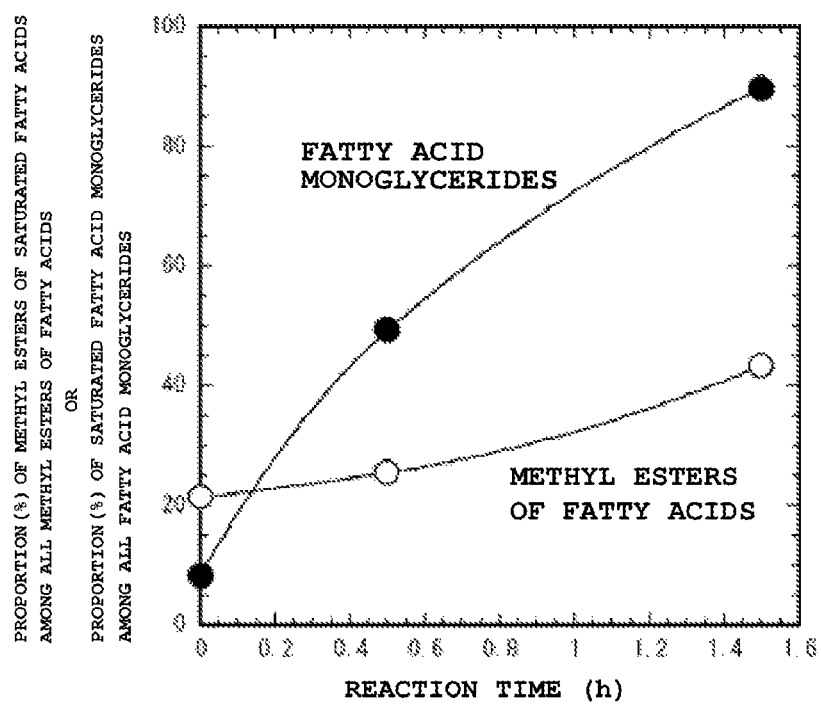
FIG. 2 is a diagram showing changes over time in the quantity of methyl esters of saturated fatty acids and the quantity of saturated fatty acid monoglycerides when hydrogenating a jatropha oil biodiesel fuel.

FIG. 2 is a diagram showing changes over time in the quantity of methyl esters of saturated fatty acids and the quantity of saturated fatty acid monoglycerides when hydrogenating a jatropha oil biodiesel fuel using an alumina-supported palladium catalyst under the conditions mentioned above, and the vertical axis shows the proportion (%) of methyl esters of saturated fatty acids among all monomethyl esters of fatty acids and the proportion (%) of saturated fatty acid monoglycerides among all fatty acid monoglycerides.

In the present invention, a method involving separation by precipitation can be given as a simple method for separating and removing fatty acid monoglycerides from a hydrogenated biodiesel fuel. The precipitation method is not particularly limited, but a method involving allowing a biodiesel fuel to stand at a prescribed temperature for 24 hours or longer is preferred in order to allow for sufficient precipitation of substances to be precipitated. If the temperature is too high when the biodiesel fuel is allowed to stand, fatty acid monoglycerides completely dissolve in the biodiesel fuel, and if this temperature is too low, methyl esters of saturated fatty acids precipitate in addition to fatty acid monoglycerides, meaning that separation of fatty acid monoglycerides becomes impossible, and the precipitation temperature is therefore preferably 10 to 45° C., and particularly preferably 12 to 40° C.

Following cooling, a variety of methods can be used as methods for separating and removing the precipitated fatty acid monoglycerides. For example, simple methods include separating precipitates by using a sieve or filter paper and separating precipitates by means of centrifugal separation.

By using an adsorbent to adsorb and remove small quantities of residual fatty acid monoglycerides from a biodiesel fuel from which fatty acid monoglycerides have been separated by precipitation, it is possible to produce a biodiesel fuel from which fatty acid monoglycerides have been removed to a high degree.

The adsorbent used to adsorb fatty acid monoglycerides is not particularly limited, but it is possible to use silica gel, clay minerals (activated clay, montmorillonite, and the like), zeolites, diatomaceous earth, magnesium silicates, alumina, and the like, which are commonly used as adsorbents.

WORKING EXAMPLES

The present invention will now be explained through the use of experimental examples, but is in no way limited to in these experimental examples.

First, explanations will be given for the definition of glyceride removal rate, the method for measuring cloud point and the method for measuring oxidation stability in the working examples.

(Definition of Glyceride Removal Rate)

Glyceride removal rate (%)=(glyceride concentration in raw material oil−glyceride concentration in purified oil)/glyceride concentration in raw material oil □100

(Measurement of Cloud Point)

In accordance with the "Testing methods for pour point and cloud point of crude oil and petroleum products" stipulated in JIS K2269, 4 mL of a sample was placed in a test tube and heated to 45° C. so as to dissolve all the components, after which the sample was cooled so as to precipitate solid components, and the temperature at which the degree of light reflection from the bottom surface of the test tube changed was measured and deemed to be the cloud point. An automatic pour point/cloud point tester (MPC-102A manufactured by Tanaka Scientific Limited) was used for the measurements.

(Measurement of Oxidation Stability)

In accordance with the method stimulated in European standard EN14112: 2003 (Rancimat method), 3 g of a sample was placed in a reaction vessel, clean air was flushed into the reaction vessel at a rate of 10 L/h while the reaction vessel was heated to 110° C., volatile degradation products were trapped in water, and the time until the turning point, where the electrical conductivity of the trapping water changed (the induction time), was measured. An automatic oil/fat stability tester (Rancimat 743 manufactured by Metrohm AG) was used for the measurements.

Hereinbelow, "Working Examples 1 to 4" should read as "Reference Examples 1 to 4," and "Working Examples 5 to 7" should read as "Examples 1 to 3."

Working Example 1: Removal of Fatty Acid Monoglycerides from Jatropha Oil Biodiesel Fuel

[Hydrogenation Reaction]

A jatropha oil biodiesel fuel having the composition shown in Table 1 was hydrogenated using an alumina-supported palladium catalyst. 150 g of a jatropha oil biodiesel fuel and 1.2 g of the catalyst were added to an autoclave fitted with a stirrer, and the reaction was carried out at a hydrogen pressure of 0.5 MPa, a reaction temperature of 80° C. and a reaction duration of 1 hour. Immediately following the reaction, the catalyst was filtered off, and a hydrogenated jatropha oil biodiesel fuel was obtained.

TABLE 1

| | |
|---|---|
| Monoglyceride content (wt. %) | 0.43 |
| Diglyceride content (wt. %) | 0.11 |
| Triglyceride content (wt. %) | 0.04 |

[Separation of Precipitates]

The hydrogenated jatropha oil biodiesel fuel obtained in the hydrogenation reaction was held at a temperature of 15° C., and precipitated deposits were filtered off to obtain a purified hydrogenated jatropha oil biodiesel fuel. The glyceride removal rates and the cloud point and oxidation stability of the raw material oil, hydrogenated oil and purified hydrogenated oil are shown in Table 2.

TABLE 2

| | |
|---|---|
| Monoglyceride removal rate (%) | 67.8 |
| Diglyceride removal rate (%) | 7.6 |
| Triglyceride removal rate (%) | 7.6 |

TABLE 2-continued

| | |
|---|---|
| Cloud point of raw material oil (° C.) | 4 |
| Cloud point of hydrogenated oil (° C.) | 13 |
| Cloud point of purified hydrogenated oil (° C.) | 8 |
| Oxidation stability of raw material oil (h) | 0.58 |
| Oxidation stability of hydrogenated oil (h) | 9.41 |
| Oxidation stability of purified hydrogenated oil (h) | 11.91 |

Comparative Example 1: Removal of Fatty Acid Monoglycerides from Jatropha Oil Biodiesel Fuel Separation of precipitates from the jatropha oil biodiesel fuel having the composition shown in Table 1 was carried out using the method disclosed in Working Example 1, without hydrogenating the biodiesel fuel. The glyceride removal rates and the cloud point of the raw material oil and purified oil are shown in Table 3.

TABLE 3

| | |
|---|---|
| Monoglyceride removal rate (%) | 9.1 |
| Diglyceride removal rate (%) | 4.3 |
| Triglyceride removal rate (%) | 1.7 |
| Cloud point of raw material oil (° C.) | 4 |
| Cloud point of purified oil (° C.) | 4 |
| Oxidation stability of raw material oil (h) | 0.58 |
| Oxidation stability of purified oil (h) | 0.65 |

Working Example 2: Removal of Fatty Acid Monoglycerides from Rape Seed Oil Biodiesel Fuel A hydrogenation reaction and precipitate separation were carried out using the same methods as those used in Working Example 1, except that a rape seed oil biodiesel fuel having the composition shown in Table 4 was used and the holding temperature was 20° C. The glyceride removal rates and the cloud point of the raw material oil, hydrogenated oil and purified hydrogenated oil are shown in Table 5.

TABLE 4

| | |
|---|---|
| Monoglyceride content (wt. %) | 0.35 |
| Diglyceride content (wt. %) | 0.07 |
| Triglyceride content (wt. %) | 0.08 |

TABLE 5

| | |
|---|---|
| Monoglyceride removal rate (%) | 52.8 |
| Diglyceride removal rate (%) | 4.9 |
| Triglyceride removal rate (%) | 4.3 |
| Cloud point of raw material oil (° C.) | −3 |
| Cloud point of hydrogenated oil (° C.) | 17 |
| Cloud point of purified hydrogenated oil (° C.) | 11 |
| Oxidation stability of raw material oil (h) | 6.75 |
| Oxidation stability of hydrogenated oil (h) | 68.43 |
| Oxidation stability of purified hydrogenated oil (h) | 71.36 |

Comparative Example 2: Removal of Fatty Acid Monoglycerides from Rape Seed Oil Biodiesel Fuel Separation of precipitates from the rape seed oil biodiesel fuel having the composition shown in Table 4 was carried out using the method disclosed in Working Example 1, except that the biodiesel fuel was not hydrogenated and the holding temperature was 20° C. The glyceride removal rates and the cloud point of the raw material oil and purified oil are shown in Table 6.

TABLE 6

| | |
|---|---|
| Monoglyceride removal rate (%) | 8.2 |
| Diglyceride removal rate (%) | 4.0 |
| Triglyceride removal rate (%) | 1.5 |
| Cloud point of raw material oil (° C.) | −3 |
| Cloud point of purified oil (° C.) | −3 |
| Oxidation stability of raw material oil (h) | 6.75 |
| Oxidation stability of purified oil (h) | 6.75 |

Working Example 3: Removal of Fatty Acid Monoglycerides from Soy Bean Oil Biodiesel Fuel A hydrogenation reaction and precipitate separation were carried out using the same methods as those used in Working Example 1, except that a soy bean oil biodiesel fuel having the composition shown in Table 7 was used. The glyceride removal rates and the cloud point of the raw material oil, hydrogenated oil and purified hydrogenated oil are shown in Table 8.

TABLE 7

| | |
|---|---|
| Monoglyceride content (wt. %) | 0.21 |
| Diglyceride content (wt. %) | 0.08 |
| Triglyceride content (wt. %) | 0.04 |

TABLE 8

| | |
|---|---|
| Monoglyceride removal rate (%) | 66.0 |
| Diglyceride removal rate (%) | 21.1 |
| Triglyceride removal rate (%) | 11.9 |
| Cloud point of raw material oil (° C.) | 0 |
| Cloud point of hydrogenated oil (° C.) | 15 |
| Cloud point of purified hydrogenated oil (° C.) | 10 |
| Oxidation stability of raw material oil (h) | 1.54 |
| Oxidation stability of hydrogenated oil (h) | 86.13 |
| Oxidation stability of purified hydrogenated oil (h) | 87.19 |

Comparative Example 3: Removal of Fatty Acid Monoglycerides from Soy Bean Oil Biodiesel Fuel Separation of precipitates from the soy bean oil biodiesel fuel having the composition shown in Table 7 was carried out using the method disclosed in Working Example 1, without hydrogenating the biodiesel fuel. The glyceride removal rates and the cloud point of the raw material oil and purified oil are shown in Table 9.

TABLE 9

| | |
|---|---|
| Monoglyceride removal rate (%) | 5.7 |
| Diglyceride removal rate (%) | 2.2 |
| Triglyceride removal rate (%) | 1.6 |
| Cloud point of raw material oil (° C.) | 0 |
| Cloud point of purified oil (° C.) | 0 |
| Oxidation stability of raw material oil (h) | 1.54 |
| Oxidation stability of purified oil (h) | 1.59 |

Comparative Example 4: Removal of Fatty Acid Monoglycerides from Jatropha Oil Biodiesel Fuel Separation of precipitates from the jatropha oil biodiesel fuel having the composition shown in Table 1 was carried out using the method disclosed in Comparative Example 1, except that the holding temperature was 4° C. The glyceride removal rates and the cloud point of the raw material oil and purified oil are shown in Table 10.

TABLE 10

| | |
|---|---|
| Monoglyceride removal rate (%) | 45.1 |
| Diglyceride removal rate (%) | 30.6 |
| Triglyceride removal rate (%) | 14.3 |
| Cloud point of raw material oil (° C.) | 1 |
| Cloud point of purified oil (° C.) | 1 |
| Oxidation stability of raw material oil (h) | 0.58 |
| Oxidation stability of purified oil (h) | 0.84 |

When the holding temperature was lowered, the glyceride removal rate increased, but the filtered precipitate contained 38.5% of methyl esters of saturated fatty acids contained in the raw material oil, and when glycerides were removed at a low temperature without carrying out hydrogenation, separation of methyl esters of fatty acids and glycerides was difficult.

Working Example 4: Removal of Fatty Acid Monoglycerides from Palm Oil Biodiesel Fuel A hydrogenation reaction and precipitate separation were carried out using the same methods as those used in Working Example 1, except that a palm oil biodiesel fuel having the composition shown in Table 11 was used. The glyceride removal rates and the cloud point of the raw material oil, hydrogenated oil and purified hydrogenated oil are shown in Table 12.

TABLE 11

| | |
|---|---|
| Monoglyceride content (wt. %) | 0.45 |
| Diglyceride content (wt. %) | 0.22 |
| Triglyceride content (wt. %) | 0.09 |

TABLE 12

| | |
|---|---|
| Monoglyceride removal rate (%) | 53.6 |
| Diglyceride removal rate (%) | 4.1 |
| Triglyceride removal rate (%) | 3.4 |
| Cloud point of raw material oil (° C.) | 12 |
| Cloud point of hydrogenated oil (° C.) | 15 |
| Cloud point of purified hydrogenated oil (° C.) | 13 |
| Oxidation stability of raw material oil (h) | 5.72 |
| Oxidation stability of hydrogenated oil (h) | 126.31 |
| Oxidation stability of purified hydrogenated oil (h) | 100.21 |

Comparative Example 5: Removal of Fatty Acid Monoglycerides from Palm Oil Biodiesel Fuel Separation of precipitates from the palm oil biodiesel fuel having the composition shown in Table 11 was carried out using the method disclosed in Working Example 1, without hydrogenating the biodiesel fuel. The glyceride removal rates and the cloud point of the raw material oil and purified oil are shown in Table 13.

TABLE 13

| | |
|---|---|
| Monoglyceride removal rate (%) | 9.2 |
| Diglyceride removal rate (%) | 9.4 |
| Triglyceride removal rate (%) | 9.7 |
| Cloud point of raw material oil (° C.) | 12 |
| Cloud point of purified oil (° C.) | 12 |
| Oxidation stability of raw material oil (h) | 5.72 |
| Oxidation stability of purified oil (h) | 5.97 |

Working Example 5: Removal of Fatty Acid Monoglycerides from Jatropha Oil Biodiesel Fuel by Additional Use of Adsorbent An adsorption-purified hydrogenated jatropha oil biodiesel fuel was obtained by adding 1 g of silica gel as an adsorbent to 10 g of the purified hydrogenated jatropha oil biodiesel fuel obtained in Working Example 1, and then filtering off the adsorbent. The removal rates of glycerides from the jatropha oil biodiesel fuel having the composition shown in Table 1 and the cloud point and oxidation stability of the raw material oil, hydrogenated oil, purified hydrogenated oil and adsorption-purified hydrogenated oil are shown in Table 14.

TABLE 14

| | |
|---|---|
| Monoglyceride removal rate (%) | 94.5 |
| Diglyceride removal rate (%) | 24.8 |
| Triglyceride removal rate (%) | 9.3 |
| Cloud point of raw material oil (° C.) | 4 |
| Cloud point of purified hydrogenated oil (° C.) | 8 |
| Cloud point of adsorption-purified hydrogenated oil (° C.) | 8 |
| Oxidation stability of raw material oil (h) | 0.58 |

TABLE 14-continued

| | |
|---|---|
| Oxidation stability of purified hydrogenated oil (h) | 11.91 |
| Oxidation stability of adsorption-purified hydrogenated oil (h) | 25.68 |

Working Example 6: Removal of Fatty Acid Monoglycerides from Jatropha Oil Biodiesel Fuel by Additional Use of Adsorbent An adsorption-purified hydrogenated jatropha oil biodiesel fuel was obtained using the same procedure as that used in Working Example 5, except that activated clay (Galleon Earth V2 manufactured by MIZUSAWA INDUSTRIAL CHEMICALS, LTD.) was used as the adsorbent. The removal rates of glycerides from the jatropha oil biodiesel fuel having the composition shown in Table 1 and the cloud point and oxidation stability of the raw material oil, hydrogenated oil, purified hydrogenated oil and adsorption-purified hydrogenated oil are shown in Table 15.

TABLE 15

| | |
|---|---|
| Monoglyceride removal rate (%) | 95.1 |
| Diglyceride removal rate (%) | 20.9 |
| Triglyceride removal rate (%) | 8.8 |
| Cloud point of raw material oil (° C.) | 4 |
| Cloud point of purified hydrogenated oil (° C.) | 8 |
| Cloud point of adsorption-purified hydrogenated oil (° C.) | 8 |
| Oxidation stability of raw material oil (h) | 0.59 |
| Oxidation stability of purified hydrogenated oil (h) | 11.91 |
| Oxidation stability of adsorption-purified hydrogenated oil (h) | 53.16 |

Working Example 7: Removal of Fatty Acid Monoglycerides from Jatropha Oil Biodiesel Fuel by Additional Use of Adsorbent An adsorption-purified hydrogenated jatropha oil biodiesel fuel was obtained using the same procedure as that used in Working Example 5, except that diatomaceous earth (manufactured by Wako Pure Chemical Industries, Ltd., fired at 500° C. for 3 hours) was used as the adsorbent. The removal rates of glycerides from the jatropha oil biodiesel fuel having the composition shown in Table 1 and the cloud point and oxidation stability of the raw material oil, hydrogenated oil, purified hydrogenated oil and adsorption-purified hydrogenated oil are shown in Table 16.

TABLE 16

| | |
|---|---|
| Monoglyceride removal rate (%) | 79.9 |
| Diglyceride removal rate (%) | 20.1 |
| Triglyceride removal rate (%) | 100 |
| Cloud point of raw material oil (° C.) | 4 |
| Cloud point of purified hydrogenated oil (° C.) | 8 |
| Cloud point of adsorption-purified hydrogenated oil (° C.) | 9 |
| Oxidation stability of raw material oil (h) | 0.58 |
| Oxidation stability of purified hydrogenated oil (h) | 11.91 |
| Oxidation stability of adsorption-purified hydrogenated oil (h) | 28.00 |

The invention claimed is:

1. A method for producing a high quality biodiesel fuel, comprising the sequential steps of:
    (a) hydrogenating a biodiesel fuel so as to selectively convert unsaturated fatty acid monoglycerides into readily precipitatable saturated fatty acid monoglycerides;
    (b) allowing the biodiesel fuel to stand still to precipitate fatty acid monoglycerides;
    (c) removing the precipitated fatty acid monoglycerides by filtration; and,
    (d) thereafter removing remaining fatty acid monoglycerides by adsorption with an adsorbent.

2. The method of claim 1, comprising precipitating the fatty acid monoglycerides in step (b) at a precipitation temperature of 10° C. to 45° C.

3. The method of claim 1, wherein the adsorbent of step (d) is at least one selected from the group consisting of silica gel, clay minerals, zeolites, diatomaceous earth, magnesium silicates, and alumina.

4. The method of claim 1, comprising hydrogenating the biodiesel fuel in step (a) at a hydrogen pressure of 0.2 MPa to 0.7 MPa.

5. The method of claim 1, comprising hydrogenating the biodiesel fuel in step (a) a reaction temperature of 80° C. to 130° C.

6. The method of claim 1, wherein the adsorbent of step (d) is at least one selected from the group consisting of silica gel, activated clay, and diatomaceous earth.

7. The method of claim 2, wherein the adsorbent of step (d) is at least one selected from the group consisting of silica gel, clay minerals, zeolites, diatomaceous earth, magnesium silicates, and alumina.

8. The method of claim 2, comprising hydrogenating the biodiesel fuel in step (a) at a hydrogen pressure of 0.2 MPa to 0.7 MPa.

9. The method of claim 2, comprising hydrogenating the biodiesel fuel in step (a) at a reaction temperature of 80° C. to 130° C.

10. The method of claim 2, wherein the adsorbent of step (d) is at least one selected from the group consisting of silica gel, activated clay, and diatomaceous earth.

11. The method of claim 3, comprising hydrogenating the biodiesel fuel in step (a) at a hydrogen pressure of 0.2 MPa to 0.7 MPa.

12. The method of claim 3, comprising hydrogenating the biodiesel fuel in step (a) at a reaction temperature of 80° C. to 130° C.

13. The method of claim 4, comprising hydrogenating the biodiesel fuel in step (a) at a reaction temperature of 80° C. to 130° C.

14. The method of claim 4, wherein the adsorbent of step (d) is at least one selected from the group consisting of silica gel, activated clay, and diatomaceous earth.

15. The method of claim 5, wherein the adsorbent of step (d) is at least one selected from the group consisting of silica gel, activated clay, and diatomaceous earth.

16. The method of claim 7, comprising hydrogenating the biodiesel fuel in step (a) at a hydrogen pressure of 0.2 MPa to 0.7 MPa.

17. The method of claim 8, comprising hydrogenating the biodiesel fuel in step (a) at a reaction temperature of 80° C. to 130° C.

18. The method of claim 8, wherein the adsorbent of step (d) is at least one selected from the group consisting of silica gel, activated clay, and diatomaceous earth.

19. The method of claim 16, comprising hydrogenating the biodiesel fuel in step (a) at a reaction temperature of 80° C. to 130° C.

\* \* \* \* \*